(12) United States Patent
Kalliske et al.

(10) Patent No.: US 7,712,770 B2
(45) Date of Patent: May 11, 2010

(54) AIRBAG

(75) Inventors: Ingo Kalliske, Postdam (DE); Mario Wendt, Stahnsdorf (DE)

(73) Assignee: Takata-Petri AG, Aschaffenburg (DE)

( * ) Notice: Subject to any disclaimer, the term of this patent is extended or adjusted under 35 U.S.C. 154(b) by 14 days.

(21) Appl. No.: 12/078,787

(22) Filed: Apr. 4, 2008

(65) Prior Publication Data
US 2008/0185823 A1    Aug. 7, 2008

Related U.S. Application Data

(63) Continuation of application No. PCT/DE2006/001706, filed on Sep. 25, 2006.

(30) Foreign Application Priority Data

Oct. 7, 2005    (DE) .................. 10 2005 049 209

(51) Int. Cl.
*B60R 21/233*    (2006.01)
*B60R 21/34*    (2006.01)

(52) U.S. Cl. .............. 280/729; 280/730.1; 280/743.1; 296/187.04

(58) Field of Classification Search .............. 280/728.1, 280/729, 730.1, 743.1; 296/187.04; 493/244; *B60R 21/233, 21/34*
See application file for complete search history.

(56) References Cited

U.S. PATENT DOCUMENTS

| 3,733,091 | A | * | 5/1973 | Fleck et al. ............... 280/729 |
| 3,752,501 | A | * | 8/1973 | Daniel et al. .............. 280/729 |
| 3,792,873 | A | | 2/1974 | Buchner et al. |
| 3,929,350 | A | * | 12/1975 | Pech ........................ 280/729 |
| 5,338,061 | A | * | 8/1994 | Nelson et al. ............. 280/729 |
| 5,505,485 | A | * | 4/1996 | Breed ....................... 280/729 |
| 5,797,621 | A | * | 8/1998 | Ono ......................... 280/730.2 |
| 5,901,979 | A | * | 5/1999 | Schneider et al. ......... 280/738 |
| 6,086,092 | A | * | 7/2000 | Hill .......................... 280/729 |
| 6,554,316 | B2 | * | 4/2003 | Schneider et al. ........ 280/743.1 |
| 7,040,653 | B1 | * | 5/2006 | Breed ....................... 280/731 |
| 7,111,866 | B2 | * | 9/2006 | Abe et al. ................. 280/729 |
| 7,404,575 | B2 | * | 7/2008 | Bito et al. ................. 280/743.1 |
| 2003/0020264 | A1 | * | 1/2003 | Abe et al. .................. 280/729 |

(Continued)

FOREIGN PATENT DOCUMENTS

DE    2 105 428    8/1972

(Continued)

*Primary Examiner*—Ruth Ilan
*Assistant Examiner*—Laura Freedman
(74) *Attorney, Agent, or Firm*—Foley & Lardner LLP

(57) ABSTRACT

An airbag module including an airbag that is inflated to cushion a vehicle occupant in the event of a collision. The airbag includes an inner chamber enclosed by an inner covering and a plurality of outer chambers that are arranged outside the inner chamber. The inner chamber forms an inner region of the airbag when inflated and the outer chambers at least partially surround the inner chamber when inflated. The outer chambers are in fluid communication with the inner chamber. At least some of the outer chambers are each enclosed by an outer covering having a covering section opposite the inner covering that does not delimit the inner chamber. The covering sections are at least partially spaced apart from the inner covering so that at least one clearance not filled with gas when the airbag is inflated is formed between the inner covering and the opposing covering sections.

27 Claims, 3 Drawing Sheets

U.S. PATENT DOCUMENTS

| | | | |
|---|---|---|---|
| 2003/0030254 A1* | 2/2003 | Hasebe | 280/729 |
| 2003/0193174 A1* | 10/2003 | Abe | 280/730.1 |
| 2004/0011581 A1* | 1/2004 | Takimoto | 180/274 |
| 2004/0074690 A1* | 4/2004 | Sato et al. | 180/274 |
| 2005/0023806 A1* | 2/2005 | Higuchi | 280/730.1 |
| 2005/0110257 A1* | 5/2005 | Cohen | 280/743.1 |
| 2005/0127643 A1* | 6/2005 | Abe et al. | 280/730.1 |
| 2005/0184489 A1* | 8/2005 | Kobayashi | 280/729 |

FOREIGN PATENT DOCUMENTS

| | | |
|---|---|---|
| DE | 198 60 827 A1 | 7/2000 |
| DE | 101 19 351 C1 | 7/2002 |
| EP | 1 452 403 A1 | 9/2004 |
| EP | 1 498 320 A2 | 1/2005 |
| GB | 2 289 653 A | 11/1995 |
| JP | 05131889 A * | 5/1993 |
| WO | WO 01/62556 A1 | 8/2001 |
| WO | WO 2005023605 A1 * | 3/2005 |

* cited by examiner

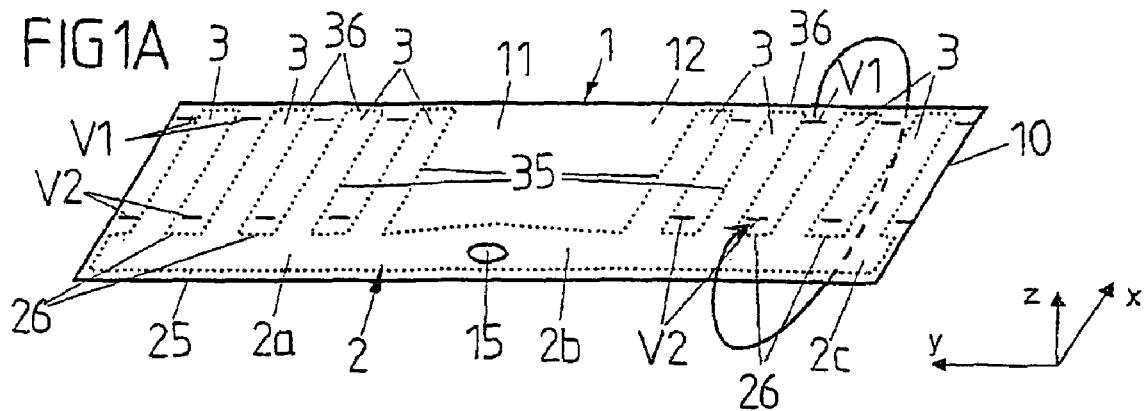
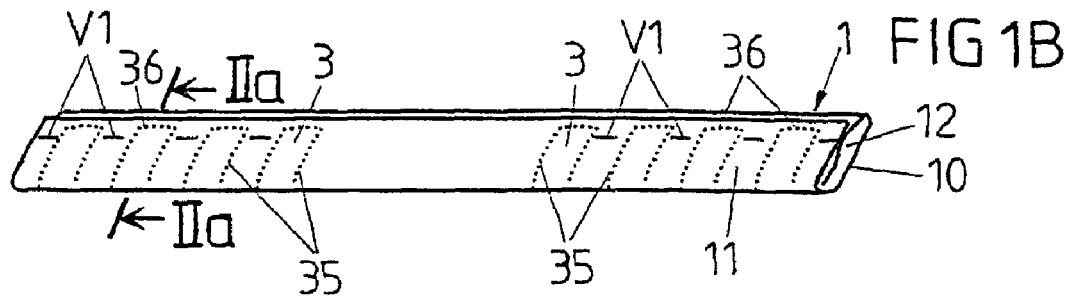
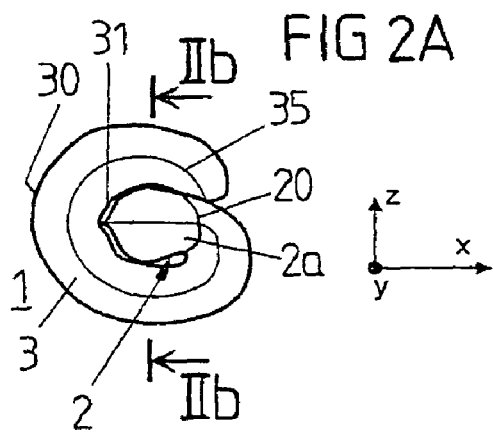
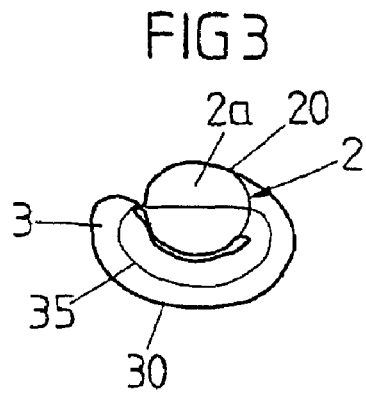
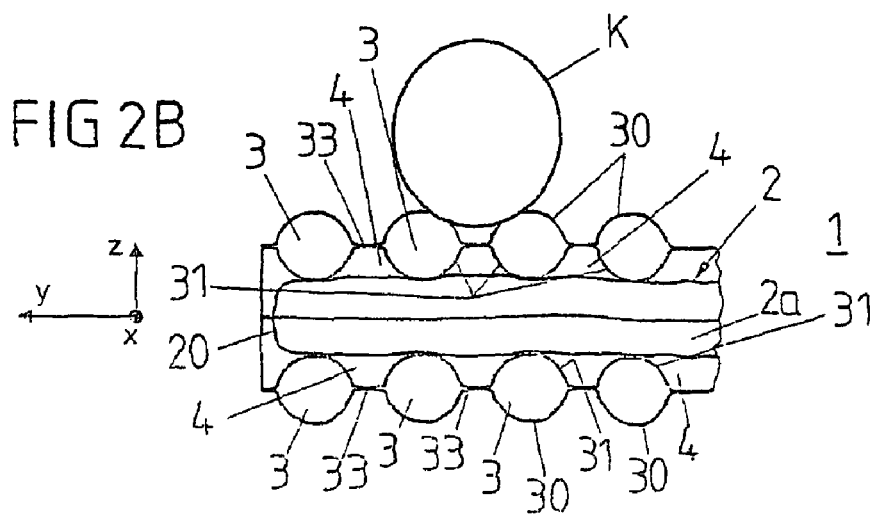

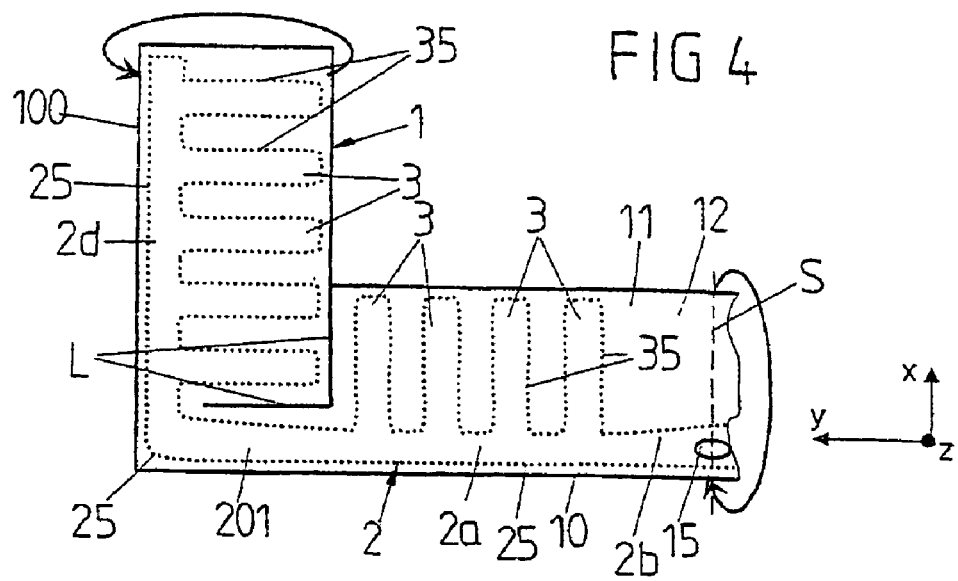
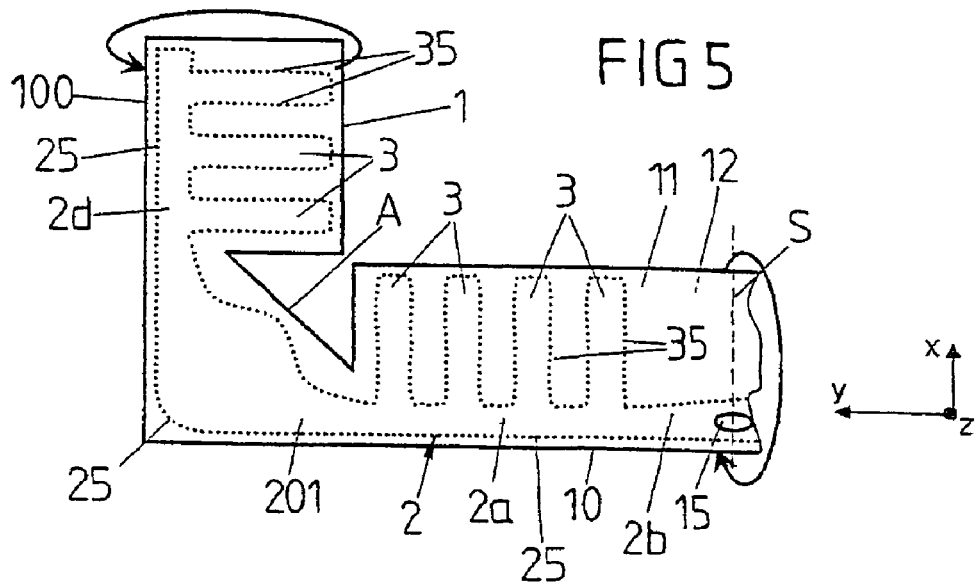
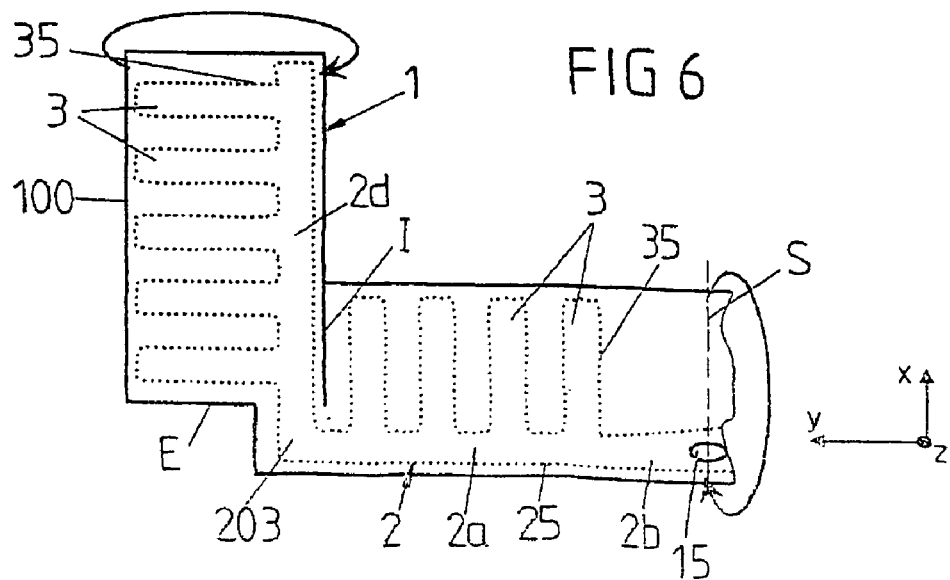

AIRBAG

CROSS-REFERENCE TO RELATED APPLICATIONS

The application is a Continuation of International Application PCT/DE2006/001706, filed Sep. 25, 2006 and was not published in English but was published in German as WO 2007/041985. The International Application is incorporated herein by reference in its entirety.

BACKGROUND

The present application generally relates to an airbag for an airbag module of a motor vehicle. More specifically the application relates to an airbag that can be inflated in the event of a collision by filling with gas to cushion a person.

SUMMARY

One embodiment of the application relates to an airbag for an airbag module of a motor vehicle that is inflated to cushion a person in the event of a collision by filling with gas. The airbag includes an inner chamber enclosed by an inner covering and a plurality of outer chambers that are arranged outside the inner chamber. The inner chamber forms an inner region of the airbag when inflated and the outer chambers at least partially surround the inner chamber when inflated. The outer chambers are in fluid communication with the inner chamber. At least some of the outer chambers are each enclosed by an outer covering having a covering section opposite the inner covering that does not delimit the inner chamber. The covering sections are at least partially spaced apart from the inner covering so that at least one clearance not filled with gas when the airbag is inflated is formed between the inner covering and the opposing covering sections.

BRIEF DESCRIPTION OF THE DRAWINGS

The invention is to be explained in embodiments with reference to drawings, in which:

FIG. 1a is a plan view of an airbag that is spread out flat and has a plurality of chambers according to an exemplary embodiment;

FIG. 1b illustrates the airbag of FIG. 1a in an operating state before the airbag is inflated according to an exemplary embodiment;

FIG. 2a is a cross section view through the airbag of FIG. 1b in an inflated state according to an exemplary embodiment;

FIG. 2b is a longitudinal section view through the airbag of FIG. 1b in an inflated state according to an exemplary embodiment;

FIG. 3 illustrates the airbag of FIG. 2a according to an alternative embodiment;

FIG. 4 illustrates a deployment of the airbag of FIG. 1a including an angled airbag section according to an exemplary embodiment;

FIG. 5 illustrates the airbag of FIG. 4 according to an alternative embodiment;

FIG. 6 illustrates the airbag of FIG. 4 according to another alternative embodiment;

DETAILED DESCRIPTION

Figure 7:
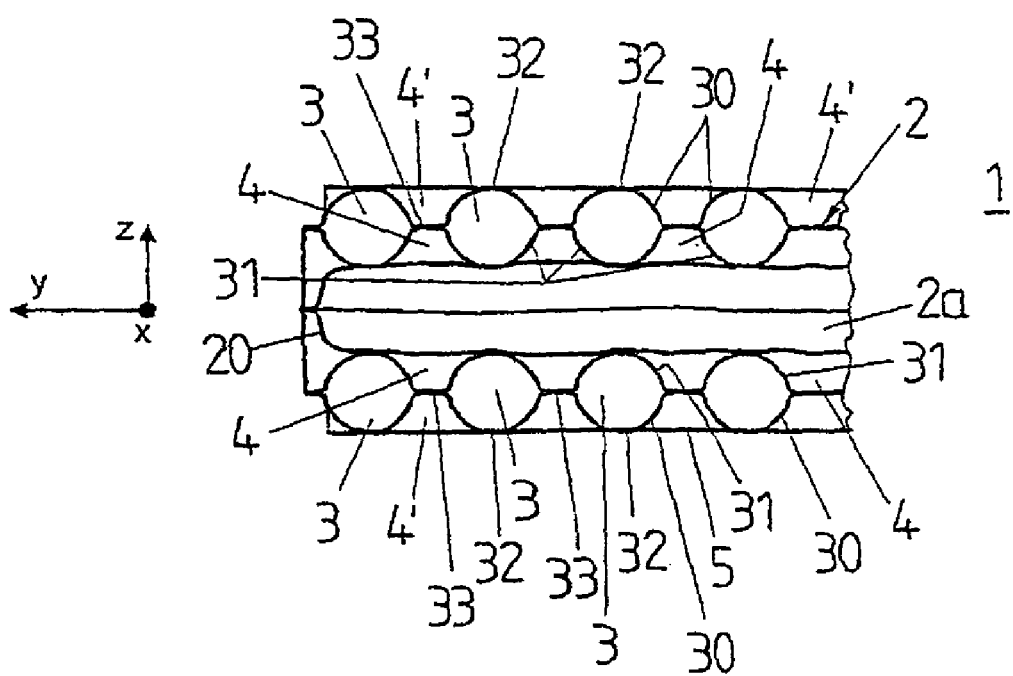
FIG. 7 is a longitudinal section view through the airbag of FIG. 2b covered by a flexible sheathing according to an exemplary embodiment.

According to an exemplary embodiment, an airbag disclosed in DE 21 05 428 A1, which is herein incorporated by reference in its entirety, includes at least one inner chamber enclosed by an inner covering of the airbag and that forms a central region of the airbag when in an inflated state. The airbag also includes a plurality of outer chambers arranged outside the inner chamber to at least partially surround the inner chamber. Individual sections of the inner covering bind the inner chamber and form a component of outer coverings surrounding the outer chambers. The individual sections may allow the outer chambers to be directly supported on the inner chamber and stabilize the airbag.

At least some of the outer chambers are each enclosed by an outer covering that has a covering section opposite and independent of the inner covering. The outer covering does not delimit the inner chamber (which is enclosed by the inner covering) of the airbag. The covering sections of the outer chambers are at least partially spaced apart from the inner covering so that at least one clearance that cannot be filled with gas when the airbag is inflated is formed between the inner covering and the covering sections of the outer chambers. The outer chambers can each be connected to the inner chamber so that when the inner chamber fills with gas the outer chambers are filled with gas and inflated.

Subregions of the outer covering sections can bear entirely against the inner covering to stabilize the arrangement. However, at least substantial subregions of those covering sections may be spaced apart from the inner covering and one or more clearances that cannot be filled with gas and are of a substantial size may be formed between the inner covering and the plurality of outer coverings.

Advantageously, the airbag may require a significantly reduced volume of gas when inflated to cushion a vehicle occupant. Therefore, smaller and lighter gas generators can be used for inflating the airbag since the clearances formed between the outer chambers and the at least one inner chamber do not have to be filled with gas. The cushioning function of the airbag is not impaired because when a person who is to be cushioned in the event of a collision impacts against the outer chambers of the airbag, the chambers can be supported on the inner chamber. The rigidity of the airbag and the size of the supporting force may be influenced by various factors, such as the internal pressure of the chambers, the manner in which the outer chambers are connected to one another, and the dimensioning of the chambers (outer and inner) as a whole. Preferably, when the airbag is inflated the outer chambers are supported on the inner covering by a subregion of a respective covering section opposite the inner chamber even without the action of external forces, thus increasing the stability of the airbag.

According to an exemplary embodiment, a plurality of clearances are formed between the inner covering and the outer coverings of the airbag. The clearances may be separated from one another by the covering sections of the outer chambers opposite the inner chamber. For example, the covering sections of the outer chambers can be arched in the direction of the inner covering and each be supported on the inner covering by a subregion arched forward the furthest. The clearances that cannot be filled with gas may be at least partially delimited by the inner covering and at least one outer covering, for example by the outer coverings of two adjacent outer chambers.

The outer coverings are preferably at least partially connected to one another, for example the outer coverings of adjacent outer chambers may each be connected to one another.

According to a preferred embodiment, the connecting regions of the outer coverings may not be gas-conducting and therefore mechanically stabilize the airbag but do not distribute gas within the airbag. The respective connecting region can be a component of an airbag layer or of a plurality of airbag layers defining the outer coverings. The corresponding airbag layers are preferably connected to one another so that gas cannot flow from one outer chamber into another outer chamber through the connecting regions.

Advantageously, the connecting regions may be tensioned when the airbag is inflated and each have a surface opposite and spaced apart from the inner covering. The connecting regions contribute to delimiting the clearances that cannot be filled with gas between the outer chambers and the inner chamber. By tensioning the connecting regions when the airbag is inflated, the outer chambers connected by the connecting regions are positioned in a manner ready for an impact by a vehicle occupant be cushioned.

According to an exemplary embodiment, each outer chamber is at least partially laid around the inner chamber, for example at an angle of at least 120°, at an angle of at least 180°, or at an angle of about 360°.

The inner chamber may extend longitudinally and the outer chambers may be arranged next to one another along the direction of extent of the inner chamber and may each protrude from the inner chamber in fluid communication. The inner chamber can be extended in a substantially continuous rectilinear shape or can be angled at least once.

The airbag may be arranged on the outside of a motor vehicle in order to cushion a person impacting against the outside of the motor vehicle, for example a pedestrian or a cyclist. An airbag extending in a substantially continuous rectilinear shape can run in a transition region between the lower end of the windshield and the engine lid. The airbag can also serve to position the rear of the engine hood in the event of a collision to dampen the impact of a person against the engine hood.

If the airbag has a substantially longitudinal extending region and two angled regions protruding from the two end sides of the extending region, the angled regions can extend, for example, along a respective A-pillar of a motor vehicle and cushion a person during impact in the region of the A-pillar.

According to an exemplary embodiment, the inner chamber and the outer chambers of the airbag may advantageously be surrounded by a flexible sheathing that bears against and is connected to outwardly arched covering sections of the outer chambers. The sheathing of the airbag covers intermediate spaces on the outside of the airbag and between the outer chambers. Therefore, additional clearances that cannot be filled with gas arise between the flexible sheathing and the connecting regions of the outer chambers of the airbag. The flexible sheathing penetrates the airbag to a depth a person's body part is to be cushioned. The traveling distance of the airbag to a body part to be cushioned is reduced and the body part may be better cushioned.

FIG. 1a shows an airbag 1 for a motor vehicle in a state in which it is spread out generally flat. The airbag 1 is delimited by an encircling outer edge 10 within which two airbag parts 11, 12, namely an upper airbag layer 11 (e.g., a fabric layer) and a lower airbag layer 12 (e.g., a fabric layer) (not shown in FIG. 1a) are connected to each other.

The two airbag parts 11, 12 can be two separate airbag parts, for example two separate fabric layers placed congruently on top of each other and connected to each other along predetermined connecting lines 25, 26; 35, 36 by a seam, by adhesives, by weaving, or by any other suitable connection. The two airbag parts 11, 12 may be components of an individual airbag blank (or mirror-symmetrical design) laid around an axis opposite the folding axis so that the two airbag parts 11, 12 lie on top of each other.

Continuous line segments 25, 26 of the connecting lines 25, 26, 35, 36 form a first chamber 2 of the airbag 1. The chamber extends longitudinally along a direction (y) and extends longitudinally along a substantially rectilinear edge section of the encircling outer edge 10 of the airbag 1. In the upper airbag part 11, the chamber 2 may communicate with a blow-in opening 15 for introducing gases emerging from a gas generator. Alternatively, in place of a blow in opening 15 for gases released by a gas generator, the chamber 2 can communicate with an introduction opening to introduce a gas generator into the interior of the chamber 2 of the airbag 1. The airbag 1 and the gas generator arranged in the interior of the longitudinally extending chamber 2 of the airbag 1 are then preferably fixed together to a motor vehicle at a suitable point.

The longitudinally extending chamber 2 can be divided into three chamber regions 2a, 2b, 2c of which—as viewed in the direction of extent of the longitudinally extending chamber 2—the chamber region 2b is located as a central chamber region between two outer (e.g., end-side) chamber regions 2a, 2c that face away from each other. The central chamber region 2b communicates with the blow-in opening 15 or an introduction opening for a gas generator.

A plurality of other chambers 3 of the airbag 1 defined by second continuous line segments 35, 36 each protrude from the two end-side chamber regions 2a, 2c that adjoin the central chamber region in the longitudinal direction. The chambers 3 (e.g., transverse chambers) are each oriented and each extend substantially transverse or perpendicular to the longitudinally extending chamber. Adjacent chambers of the other chambers 3 are each spaced apart from each other along the direction of extent (y) of the longitudinally extending chamber 2. The other chambers 3 each extend substantially from the chamber 2 as far as the edge section of the encircling outer edge 10 of the airbag 1 opposite the chamber 2.

The other chambers 3 (transverse chambers) do not have their own inflow openings for the direct inflow of gas from a gas generator. The transverse chambers 3 are each in fluid communication with the longitudinally extending chamber 2 (longitudinal chamber). Therefore, the transverse chambers 3 can be filled with gases flowing through the blow-in opening 15 into the longitudinal chamber 2 and then into the transverse chambers 3.

The airbag 1 is folded over for installation in or on a motor vehicle as illustrated with reference to FIGS. 1a and 1b. Referring to FIG. 1b, three folded layers that lie above another are formed. The folding is done by laying the transverse chambers 3 around the longitudinal chamber 2, as indicated by the arrows in the Figure and as can be seen with reference to the ready folded airbag according in FIG. 1b. The length of the transverse chambers 3 along the direction (x) transverse to the direction of extent (y) of the longitudinal chamber 2 is defined so that the transverse chambers 3 completely enclose the longitudinal chamber 2 transversely to the direction of extent (y).

After the airbag 1 is folded over in accordance with the transition from FIG. 1a to FIG. 1b to form three folded layers of the airbag 1, the folded layers of the airbag 1 are connected to one another, for example by sewing. The connecting points V1, V2 are each located in a non-inflatable region of the airbag 1 between two transverse chambers 3 spaced apart from each other along the direction of extent (y). In the case, the connecting points V1, V2 located between two respectively adjacent transverse chambers are each spaced apart from each other along the direction of extent (x) of the transverse chambers 3 so that the transverse chambers 3 each completely surround the longitudinal chamber 2.

FIGS. 2a and 2b illustrate the airbag shown in FIG. 1b as a cross section through one of the transverse chambers 3 and as a longitudinal section through the longitudinal chamber 2 in the inflated state of the airbag 1. In the inflated state of the airbag 1 the longitudinal chamber 2 forms an inner chamber delimited by an inner covering 20. The inner covering 20 is defined by the two airbag parts 11, 12 of the airbag 1. The airbag parts are connected to each other along the first continuous line segments 25, 26 of the connecting lines 25, 26, 35, 36.

When the airbag 1 is inflated, the transverse chambers 3 form outer chambers that are each surrounded by an outer covering 30. The transverse chambers 3 also enclose the inner chamber 2 and are spaced apart from one another along the direction of extent (y) of the inner chamber or longitudinal chamber 2. The outer chambers 3 are each spaced apart from and connected to one another by connecting regions 33 that cannot be inflated and are formed by the two airbag parts 11, 12. The folded layers of the airbag 1 are connected to each other at the connecting points V1, V2 located in the connecting regions 33.

The outer coverings 30 enclosing the outer chambers 3 each include a covering section 31 and are each positioned opposite the inner chamber 2 or the inner covering 20. The covering sections 31 are curved or arched in the direction of the inner covering 20 of the inner chamber 2 so that when the airbag is inflated, a subregion of each covering section 31 bears against the inner covering 20. When the airbag is not inflated, the covering sections are spaced apart from the inner covering 20.

A non-inflatable airbag region such as a clearance or cavity 4 is formed between adjacent outer chambers 3 or between the outer coverings 30 and by parts of the covering sections 31 of two adjacent outer chambers 3 are connected to each other by the connecting region 33. The airbag region is delimited by a respective connecting region 33 of adjacent outer chambers 3 and by the subregion of the inner covering 20. The subregion lies opposite and is spaced apart from the respective connecting region 33.

The clearances or cavities 4 that cannot be filled with gas define a considerable volume that does not have to be filled with gas to effectively cushion a person in the event of a collision. The clearances 4 are arranged completely within the airbag 1 and are delimited outward by the outer chambers 3 and the connecting regions 33. Preferably, the outer chambers 3 can be supported on the inner chamber 2 and the connecting regions 33 between adjacent outer chambers 3 are tensioned when the airbag is inflated. It may not be necessary for the outer chambers 3 to bear against the inner covering 20 when the airbag is load-free or inflated. A certain distance can be provided between the covering sections 31 that is only overcome when the impact of a person against the airbag in the direction of the inner chamber 2 causes the outer chambers 3 to receive an impact force.

The tensioning of the connecting regions 33 between the coverings 30 of the outer chambers 3 and the capability of the outer chambers 3 to be supported via outer coverings 30 on the inner covering 20 make it possible for the impact of a body part (e.g., a person's head K as shown schematically in FIG. 2b) to be intercepted and cushioned by the airbag. The impact forces produced by the impacting body part or head K act on the outer chambers 3 of the airbag 1. The outer chambers remain flexible when cushioning the impacting head K due to the tensioning of the connecting regions 33 and the capability of being supported on the inner chamber 2. The impact forces introduced into the outer chambers 3 by the impact are also introduced via the connecting regions 33 into the surrounding outer chambers 3 and into the inner chamber 2 by the outer chambers 3 being supported on the inner chamber 2. Therefore, the outer chambers 3 and the remaining outer chambers 3 and the inner chamber 2 provide a gas-filled cushion to dampen the impact of the person.

FIG. 3 shows a modification of the airbag in FIGS. 1a-2b in a cross section view when the airbag is inflated according to an exemplary embodiment. The outer chambers of the do not engage around the inner chamber 2 completely (i.e. at an angle of 360°) as in the airbag of FIGS. 1a-2b, but engage around half of the inner chamber 2 (i.e. at an angle of approximately 180°). The partial engagement can be achieved by folding over a flatly spread out airbag 1 so that it includes two folded layers rather than three. Therefore, although the outer chambers 3 extend along part of the inner covering 20 of the inner chamber 2, they do not engage around the inner covering 20 completely (at an angle of 360°).

A longitudinally extending airbag as illustrated with reference to FIGS. 1a-2b and with reference to FIG. 3 may be suitable, for arranging on the lower edge of a windshield of a motor vehicle (e.g., at the transition of the windshield to the engine hood or engine lid). The airbag can also raise the windshield-side end of the engine hood or engine lid in the event of a collision. The airbag is intended to dampen or cushion the impact of a pedestrian's or cyclist's head when struck against the rear end of the engine hood in a collision (e.g., against the end section of the engine hood facing the windshield of a motor vehicle, on the lower region of the windshield, etc.). The impact against the inflated airbag 1 may reduce the amount of force on the head.

Because of the clearances or cavities 4 that cannot be filled with gas, a significantly reduced gas volume suffices to fill the airbag 1 and the time impact energy can be dissipated in a specific manner without—in comparison to an airbag which can be completely filled with gas—increasing the amount of impact force. This is possible because the outer chambers 3 of the airbag 1 that come into contact with the body parts to be cushioned during the impact are coupled to one another by the tensioned or stressed connecting regions 33 and are also coupled to the inner chamber 2 in a defined manner via the covering sections 31 opposite the inner chamber 2 that are supported on the covering 20.

FIG. 4 shows a deployment of the flattened airbag in FIGS. 1a-2b. Only part of the airbag 1 is illustrated in FIG. 4 as the complete airbag 1 is produced by mirroring the part shown in FIG. 4 along an axis S that runs through the blow-in opening 15 and extends along a direction perpendicular to the longitudinal chamber 2 and parallel to the transverse chambers 3. In other words, FIG. 4 only shows one half of the airbag 1, which has a mirror-inverted design.

The difference between the airbag 1 (shown spread out flat in FIG. 4) and the airbag in FIG. 1a is that, according to FIG. 4 the airbag 1 has an angled end section 100. The longitudinal chamber 2 runs with an end region 2d substantially perpendicular to chamber regions 2a, 2b, 2c that extend longitudinally along a direction (y) of the longitudinal chamber 2. The airbag includes a transition region 201 between the angled end region 2d of the longitudinal chamber 2 and the adjoining chamber region 2a of the longitudinal chamber 2.

Transverse chambers 3 protrude from the angled end region 2d of the longitudinal chamber 2 and are oriented perpendicular to the transverse chambers 3 that protrude from the remaining chamber regions 2a, 2c that extend along a direction (y) of the longitudinal chamber 2.

A corresponding angled end section 100 of the airbag 1 is located at the opposite end (not illustrated in FIG. 4) of the airbag 1 and is mirrors the part of the airbag 1 shown in FIG. 4 by the above-defined mirror axis S running through the blow-in opening 15.

The airbag 1 shown in FIG. 4 can also be formed by two airbag parts 11, 12 sewn to each other (e.g., as fabric layers) but incision L (e.g., an L-shaped incision) may be required in the transition region to the angled end section 100 so that the airbag 1 can be folded over from the state in which it is spread out flat. The folding forms three folded layers lying one above another and when the airbag 1 is inflated the outer chambers 3 formed by the transverse chambers enclose the inner chamber formed by the angled longitudinally extending chamber 2. The inflated airbag therefore corresponds in cross section to the illustration of FIG. 2a.

An airbag 1 of the type illustrated in FIG. 4 may be suitable, for example, for covering the transition region between the engine hood and windshield on the outer region of a motor vehicle and the A-pillars on both sides of motor vehicle in front of the side doors. The A-pillars may be covered by the two angled end sections 100 of the airbag 1.

FIG. 5 shows a modification of the arrangement from FIG. 4. The airbag is different in that the airbag 1 has a cutout A instead of an L shaped incision in the transition region to the angled end section 100. Furthermore, the longitudinally extending chamber 2 (inner chamber) is wider in the corresponding transition region 202.

According to the exemplary embodiments of FIGS. 4 and 5, the angled end section 100 and the transverse chambers 3 are each oriented to lead away from the longitudinally extending chamber or inner chamber 2 in the direction of the opposite angled end section (not illustrated in FIGS. 4 and 5) at the other end of the spread out airbag.

In contrast, the exemplary embodiment shown in FIG. 6 includes transverse chambers 3 for forming the outer chambers that are oriented in the opposite direction, i.e. away from the other end section of the airbag 1. The angled section 100 of the airbag 1 is folded over so that the transverse chambers 3 defining the outer chambers are laid around the longitudinally extending chamber 2 (which defines the inner chamber) or around the angled end region 2d of the chamber—i.e. in the opposite direction in comparison to FIGS. 4 and 5.

The transition region to the angled end section 100 of the airbag 1 includes an I-shaped incision extending in a rectilinear manner and an outer corner cutout E. The longitudinally extending chamber 2 includes contour in a transition region 203 corresponding to the angled end section 2d.

In each of the exemplary embodiments, the cross section and the design of the longitudinally extending chamber 2 (which defines the inner chamber when the airbag is inflated and may be angled) and the design and length of the transverse chambers 3 defining the outer chambers can be varied, adapted, or configured to any specific purpose of the airbag 1 for any individual situation. Likewise, other parameters of the airbag (e.g., the distance between adjacent outer chambers 3, the width of the tensioned connecting regions 33 situated in-between, etc.) can be varied, adapted, or configured to any situation.

FIG. 7 shows a deployment of the airbags of FIGS. 1a-6 in a longitudinal section similar to the section shown in FIG. 2b. In contrast to the exemplary embodiments shown with reference to FIGS. 1a-6, the airbag 1 illustrated in FIG. 7 has an outer sheathing 5 composed of a flexible material (e.g., a fabric or other suitable flexible material). The outer sheathing 5 cushions and covers both the inner chamber 2 and the outer chambers 3 of the airbag 1, bears against arched covering sections 32 (which point outward or away from the inner chamber 2), and is fastened to the outer coverings in a suitable manner (e.g., by adhesive bonding, by sewing, etc.). Clearances 4' that cannot be filled with gas are formed between the flexible outer sheathing 5 and the outer coverings 30 and connecting regions 33.

The flexible outer sheathing 5 that cushions and covers the inner chamber 2 and the outer chambers 3 of the airbag 1 advantageously reduces the penetration depth of a body part to be cushioned (e.g., a head K) up to the beginning of energy dissipation since the gaps (clearances 4') between the outer chambers 3 (on the outside of the airbag 1) are covered by the sheathing 5. With the flexible sheathing 5, the airbag 1 defines a surface corresponding to the surface of a customary, non-structured airbag for an airbag module.

Germany Priority Application 102005049209.6, filed Oct. 7, 2005 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An airbag for an airbag module of a motor vehicle, the airbag being inflated to cushion a person in the event of a collision by filling with gas, comprises:

an inner chamber enclosed by an inner covering, the inner chamber forming an inner region of the airbag when inflated;

a plurality of outer chambers that are arranged outside the inner chamber, the outer chambers at least partially surrounding the inner chamber when inflated; and a gas generator to provide gas to inflate the airbag, wherein the outer chambers are in fluid communication with the inner chamber, wherein the outer chambers do not have inflow openings for direct inflow of gas from a gas generator, but are in fluid communication with the inner chamber in such a manner that the outer chambers are configured to be inflated exclusively with gas from the inner chamber, wherein at least some of the outer chambers are each enclosed by an outer covering having a covering section opposite the inner covering that does not delimit the inner chamber, and wherein the covering sections are at least partially spaced apart from the inner covering so that at least one clearance not filled with gas when the airbag is inflated is formed between the inner covering and the opposing covering sections.

2. The airbag as claimed in claim 1, wherein a plurality of clearances that cannot be filled with gas are formed between the inner covering and the opposing covering sections.

3. The airbag as claimed in claim 2, wherein the clearances are separated from one another by the covering sections.

4. The airbag as claimed in claim 1, wherein the covering sections are arched in the direction of the inner covering.

5. The airbag as claimed in claim 4, wherein the covering sections are supported on the inner covering by a subregion arched in the direction of the inner covering.

6. The airbag as claimed in claim 1, wherein the outer coverings are supported on the inner covering by the covering sections.

7. The airbag as claimed in claim 1, wherein the at least one clearance not filled with gas is at least partially delimited by the inner covering and by at least one outer covering.

8. The airbag as claimed in claim 7, wherein the at least one clearance not filled with gas is at least partially delimited by the inner covering and the outer coverings of two adjacent outer chambers.

9. The airbag as claimed in claim 1, wherein at least some of the outer coverings are connected to one another in pairs.

10. The airbag as claimed in claim 9, wherein the outer coverings are connected to one another by connecting regions that do not conduct gas.

11. The airbag as claimed in claim 10, wherein each connecting region forms a component of at least one airbag part to form the outer coverings.

12. The airbag as claimed in claim 10, wherein the connecting regions are tensioned when the airbag is inflated.

13. The airbag as claimed in claim 10, wherein the connecting regions each have a surface opposite the inner covering and that is spaced apart from the inner covering.

14. The airbag as claimed in claim 10, wherein the at least one clearance not filled with gas is at least partially delimited by the inner covering, the outer coverings of two adjacent outer chambers, and a connecting region of the two outer chambers.

15. The airbag as claimed in claim 1, wherein each of the outer coverings are laid around the inner covering.

16. The airbag as claimed in claim 15, wherein each outer covering encloses an angle of at least 120°.

17. The airbag as claimed in claim 16, wherein each outer covering encloses an angle of at least 180°.

18. The airbag as claimed in claim 17, wherein each outer covering encloses an angle of about 360°.

19. The airbag as claimed in claim 1, wherein the outer chambers are spaced apart from one another.

20. The airbag as claimed in claim 1, wherein the outer chambers each protrude from the inner chamber.

21. The airbag as claimed in claim 1, wherein the inner chamber extends longitudinally.

22. The airbag as claimed in claim 21, wherein the inner chamber comprises a substantially continuous rectilinear shape.

23. The airbag as claimed in claim 1, wherein the airbag is placed into at least two folded layers when not inflated so that the outer chambers at least partially engage around the inner chamber, wherein the folded layers of the airbag are connected to one another at connecting points so that the outer chambers engage around the inner chamber in the inflated state.

24. The airbag as claimed in claim 1, further comprising two airbag fabric layers connected to each other along connecting lines to form the inner chamber and the plurality of outer chambers, wherein the inner chamber and the plurality of outer chambers are formed from the same two airbag fabric layers, and wherein each of the plurality of outer chambers protrude from the inner chamber substantially transverse to a direction of extent of the inner chamber.

25. The airbag as claimed in claim 24, wherein the airbag fabric layers are connected to each other along the connecting lines in a continuous fashion or in a punctiform manner.

26. The airbag as claimed in claim 24, wherein the airbag fabric layers are connected to each other along the connecting lines by sewing, weaving, and/or adhesive bonding.

27. The airbag as claimed in claim 24, wherein the inner chamber and the plurality of outer chambers are in fluid communication with each other at the locations where the plurality of outer chambers protrude from the inner chamber.

* * * * *